United States Patent
Dholakia et al.

(10) Patent No.: US 9,176,313 B2
(45) Date of Patent: Nov. 3, 2015

(54) OPTICAL MANIPULATION OF MICRO-PARTICLES

(75) Inventors: Kishan Dholakia, St Andrews (GB); Michael Mazilu, St Andrews (GB); Jorg Baumgartl, St Andrews (GB)

(73) Assignee: UNIVERSITY COURT OF THE UNIVERSITY OF ST ANDREWS, St. Andrews (GB)

( * ) Notice: Subject to any disclaimer, the term of this patent is extended or adjusted under 35 U.S.C. 154(b) by 0 days.

(21) Appl. No.: 13/057,706

(22) PCT Filed: Aug. 28, 2009

(86) PCT No.: PCT/GB2009/002089
§ 371 (c)(1),
(2), (4) Date: Feb. 16, 2011

(87) PCT Pub. No.: WO2010/023455
PCT Pub. Date: Mar. 4, 2010

(65) Prior Publication Data
US 2011/0133104 A1 Jun. 9, 2011

(30) Foreign Application Priority Data
Aug. 29, 2008 (GB) .................................. 0815774.5

(51) Int. Cl.
*H01S 3/00* (2006.01)
*G02B 21/32* (2006.01)

(52) U.S. Cl.
CPC ..................................... *G02B 21/32* (2013.01)

(58) Field of Classification Search
None
See application file for complete search history.

(56) References Cited

U.S. PATENT DOCUMENTS

| | | | | |
|---|---|---|---|---|
| 3,808,550 A | * | 4/1974 | Ashkin | 372/97 |
| 5,831,719 A | * | 11/1998 | Berg et al. | 356/5.13 |
| 6,459,484 B1 | * | 10/2002 | Yokoi | 356/318 |
| 6,823,124 B1 | * | 11/2004 | Renn et al. | 385/125 |
| 7,473,890 B2 | * | 1/2009 | Grier et al. | 250/251 |
| 7,651,598 B2 | * | 1/2010 | Shapiro et al. | 204/450 |
| 7,750,329 B2 | * | 7/2010 | Botchway et al. | 250/559.05 |
| 2002/0113205 A1 | * | 8/2002 | Ohmukai et al. | 250/251 |
| 2005/0017161 A1 | * | 1/2005 | Grier et al. | 250/251 |
| 2005/0051429 A1 | * | 3/2005 | Shapiro et al. | 204/452 |
| 2005/0247866 A1 | * | 11/2005 | Plewa et al. | 250/251 |
| 2006/0131494 A1 | * | 6/2006 | Grier et al. | 250/251 |
| 2006/0257089 A1 | * | 11/2006 | Mueth et al. | 385/125 |
| 2007/0084993 A1 | * | 4/2007 | Grier et al. | 250/251 |

(Continued)

FOREIGN PATENT DOCUMENTS

| | | | | |
|---|---|---|---|---|
| EP | 1850182 A2 | * | 10/2007 | G03F 7/20 |
| EP | 1850182 A2 | | 10/2007 | |

(Continued)

OTHER PUBLICATIONS

Tatarkova et al, ((Jul. 18, 2003) "Brownian Particle in an Optical Potential of the Washboard Type", Physical Review Letters, vol. 91, No. 3, pp. 038101-1 to 038101-4).*

(Continued)

*Primary Examiner* — Andrew Smyth
(74) *Attorney, Agent, or Firm* — Moore & Van Allen PLLC; W. Kevin Ransom (57) ABSTRACT

A method for manipulating one or more particles comprising exposing the particle(s) to a beam of radiation that is able to lift and or impart an acceleration to the particle(s) to cause it to move in a curved trajectory.

33 Claims, 7 Drawing Sheets

(56) References Cited

U.S. PATENT DOCUMENTS

| | | | |
|---|---|---|---|
| 2007/0251543 A1* | 11/2007 | Singh | 134/1 |
| 2008/0007731 A1* | 1/2008 | Botchway et al. | 356/338 |
| 2008/0279558 A1* | 11/2008 | Capron et al. | 398/118 |
| 2009/0032692 A1* | 2/2009 | Hsu et al. | 250/251 |

FOREIGN PATENT DOCUMENTS

| | | | | |
|---|---|---|---|---|
| WO | WO02/39104 | A1 | 5/2002 | |
| WO | WO2004/025668 | A2 | 3/2004 | |
| WO | WO 2004025668 | A2 * | 3/2004 | G21K 1/00 |
| WO | WO2006/032844 | A2 | 3/2006 | |
| WO | WO 2006032844 | A2 * | 3/2006 | |

OTHER PUBLICATIONS

Singh et al. (US 20070251543 A1) in view of Tatarkova et al, ((July 18, 2003) "Brownian Particle in an Optical Potential of the Washboard Type", Physical Review Letters, vol. 91, No. 3, pp. 038101-1 to 038101-4).*

Siviloglou et al. ("Observation of Accelerating Airy Beams"; Physical Review Letters, vol. 99, Nov. 23, 2007, pp. 213901-1-213901-4).*

Ozeri, et al., ("Long spin relaxation times in a single-beam blue-detuned optical trap," Rapid Communications, 59:3, Mar. 1999, pp. 1750-1753).*

Milne et al. ("Transverse particle dynamics in a Bessel beam"; Optics Express, vol. 15, No. 21, Oct. 17, 2001, pp. 13972-13987)) (Note this is citation No. 15 of the IDS of Mar. 31, 2011).*

Tatarkova et al. ("Brownian Particle in an Optical Potential of the Washboard Type"; Physical Review Letters, vol. 91, No. 3, Jul. 18, 2003, pp. 038101-1-038101-4).*

Graham, Milne et al: "Rectifying transport of a mixture of Brownian particles on an asymmetric periodic optical potential"; Proceedings of SPIE, vol. 5330, May 2004, pp. 112-119.

Chou, Chia-Fu et al.: "Electrodeless Dietectrophoresis of Single- and Double-Stranded DNA", Biophysical Journal, vol. 83, Oct. 2002, pp. 2170-2179.

Chiou, Pei Yu et al.: "Massively parallel manipulation of single cells and microparticles using optical images"; Nature, vol. 436, Jul. 21, 2005, pp. 370-372.

Chiou, Pei Yu et al.: "Toward all optical lab-on-a-chip system: optical manipulation of both microfluid and microscopic particles"; Proceedings of SPIE, vol. 5514, Oct. 2004, pp. 73-81.

Gascoyne, Peter R. C. et al.: "Particle separation by dielectrophoresis"; Electrophoresis, vol. 23, 2002, pp. 1973-1983.

Dholakia, Kishan: "Interference patterns for advanced optical micromanipulation"; Proceedings of SPIE, vol. 5531, Aug. 2004, pp. 1-6.

Siviloglou, J. Broky et al.: "Observation of Accelerating Airy Beams"; Physical Review Letters, vol. 99, Nov. 23, 2007, pp. 213901-1-213901-4.

Arlt, J. et al.: "Optical micromanipulation using a Bessel light beam"; Optics Communications, vol. 197, No. 4-6, Oct. 1, 2001, pp. 239-245.

Milne, Graham et al.: "Transverse particle dynamics in a Bessel beam"; Optics Express, vol. 15, No. 21, Oct. 17, 2001, pp. 13972-13987.

Ashkin, A. et al.: "Acceleration and Trapping of Particles by Radiation Pressure"; Physical Review Letters, vol. 24, No. 4, Jan. 26, 1970, pp. 156-159.

Dholakia, Kishan et al.: "Optical Separation of Cells on Potential Energy Landscapes: Enhancement With Dielectric Tagging"; IEEE Journal of Selected Topics in Quantum Electronics, vol. 13, No. 6, Nov. 1, 2007;, pp. 1646-1654.

Li, Dazhi et al.: "Laser-Bessel-Beam-Driven Electron Acceleration"; Japanese Journal of Applied Physics, vol. 44, No. 8, 2005, pps. 6079-6083.

McGloin, David et al.: "Touchless Tweezing"; Spies OE Magazine, Jan. 2003, pp. 42-44.

Dholakia, Kishan et al.: "Optical micromanipulation"; Chemical Society Reviews, vol. 37, 2008, pp. 42-55.

Davis, Jeffrey A. et al.: "Observation of accelerating parabolic beams"; Optics Express, vol. 16, No. 17, Aug. 18, 2008, pp. 12866-12871.

Berry, M. V. et al.: "Nonspreading wave packets"; American Journal of Physics, vol. 47, No. 3, Mar. 1979, pp. 264-267.

International Search Report for PCT/GB2009/002089 dated Jan. 13, 2010.

International Search Report for PCT/GB2005/003476 dated May 15, 2006.

UK Search Report for GB0815774.5 dated Dec. 5, 2008.

D. G. Grier; "A Revolution in Optical Manipulation", NATURE, vol. 424, No. 6950, Aug. 14, 2003 pp. 810-816; XP002276075, DOI: 10.1038/NATURE01935.

L. Paterson et al.; "Controlled Rotation of Optically Trapped Microscopic Particles", Science, vol. 292, No. 5518, Apr. 5, 2001, pp. 912-914; XP055201860, DOI: 10.1126/SCIENCE.1058591.

EP Examination Report for Application No. 09785020.0 dated Jul. 17, 2015.

* cited by examiner

OPTICAL MANIPULATION OF MICRO-PARTICLES

FIELD OF THE INVENTION

The present invention relates to optical manipulation and in particular optical manipulation using, for example an Airy beam.

BACKGROUND OF THE INVENTION

Optical micromanipulation has expanded into a substantial field that continues to have major impact upon the biological and colloidal sciences, see Dholakia, K. et al, Optical micromanipulation. *Chem. Soc. Rev.* 37, 42-55 (2008). A particular theme that has emerged is the use of novel light fields and extended arrays of traps: these may be grouped under the particular title of "optical potential energy landscapes". The ability to influence the movement of colloidal and biological objects in such landscapes is of importance in observing phase transitions and to initiate optical sorting. Such microparticles respond to the gradient and scattering forces exerted and follow trajectories not commensurate with the flow direction of the liquid in which the particles are provided.

SUMMARY OF THE INVENTION

According to the present invention, there is provided a method for causing particles to accelerate along one or more curved trajectories using one or more a beams, for example an Airy beam, that has a curved, for example, parabolic profile.

Moving a particle up and along a curved trajectory using an Airy beam is possible because of the fundamental nature of the beam. Movement can be imparted to the particle by the beam without the need for microfluidic flow or beam movement. This is a significant advantage.

An Airy wavepacket has been shown theoretically by Berry, M. V. & Balazs, N. L. Nonspreading wave packets. *Am. J. Phys.* 47, 264-267 (1979) to be "diffraction-free" solution to the Schrödinger equation for a free particle. In the absence of any external potential the wavepacket may freely accelerate transverse to its propagation direction. The mathematical analogy between the Schrödinger equation and the paraxial wave equations may be used to realise finite energy Airy beams in the optical domain as recently witnessed, see Siviloglou, G. A., Broky, J., Dogariu, A. & Christodoulides, D. N. "Observation of Accelerating Airy Beams" *Phys. Rev. Lett.* 99, 213901 (2007). The beam has the form of a central maximum and a number of side lobes that exhibit transverse motion. These beams remain, however, a curiosity and have not yet been employed in any useful application.

An Airy beam has a transverse acceleration associated with its light field. Particle trajectories may be induced to follow parabolic trajectories, commensurate with that transverse acceleration. As well as Airy beam(s), other parabolic beams, or appropriate combinations of beams/beam arrays/scanned beams, may also be used, for example a titled Bessel beam. Examples of parabolic beams are described in Davis, J. A. et al, Observation of accelerating parabolic beams. *Opt. Express* 16, 12866-12871 (2008).

The present invention can be used to invoke precise transfer or "clearing" of particles from a given quadrant in a sample chamber with no motion of the light beam. When an Airy beam is used, it acts as a form of micron-sized "snowblower" attracting particles at the bottom to blow them upwards and sidewards.

Whilst avoiding the use of micro-fluidics and scanning arrangements can be desirable, in some circumstances these may be used in conjunction with the curved beams described herein.

BRIEF DESCRIPTION OF THE DRAWINGS

Various aspects of the invention will now be described by way of example only with reference to the accompanying drawings, of which:

FIG. 5(*a*) is plot of particle number versus time in the four sections of the image of FIG. 4;

FIG. 5(*b*) is plot of measured x and y components (square and circle symbols respectively) versus propagation distance for an Airy beam in a first direction;

FIG. 5(*c*) is plot of measured x and y components (square and circle symbols respectively) versus propagation distance for an Airy beam in the direction opposite to that of FIG. 4(*b*);

FIG. 6(*a*) is a series of images obtained by experiment of an Airy beam at different propagation distances;

FIG. 6(*b*) is a series of images obtained by experiment of an Airy beam at different propagation distances, where an non-transparent particle blocks the main spot of the beam, and FIG. 6(*c*) is a series of images obtained by experiment of an Airy beam at different propagation distances, where a transparent particle blocks the main spot of the beam.

DETAILED DESCRIPTION OF THE DRAWINGS

The present invention provides a system and method for optically manipulating particles using a beam or combination of beams that can levitate and project particles along a curved path, so that specific areas can be completely cleared. Particles are lifted and moved along a three-dimensional trajectory using the beam's optical potential until the optical lifting action is overcome and the particles fall under the action of gravity or an appropriate beam counter propagating to the levitating beam. The accelerating curved beam induces a form of transverse deflection that accompanies vertical guiding (translation) of a given particle ensemble.

As an example of a beam that can be used to cause particles to follow an upwards and sidewards curved path, an Airy beam could be used. This has a characteristic intensity pattern that drags particles into a main intensity maximum, which guides particles vertically along a parabolic trajectory, until the optical potential reduces and the particle falls. This peculiar property of Airy beams permits the removal of particles and cells from within one area, for example a section of a sample chamber, to another area without requiring movement of the beam or microfluidic flow.

Figure 1:
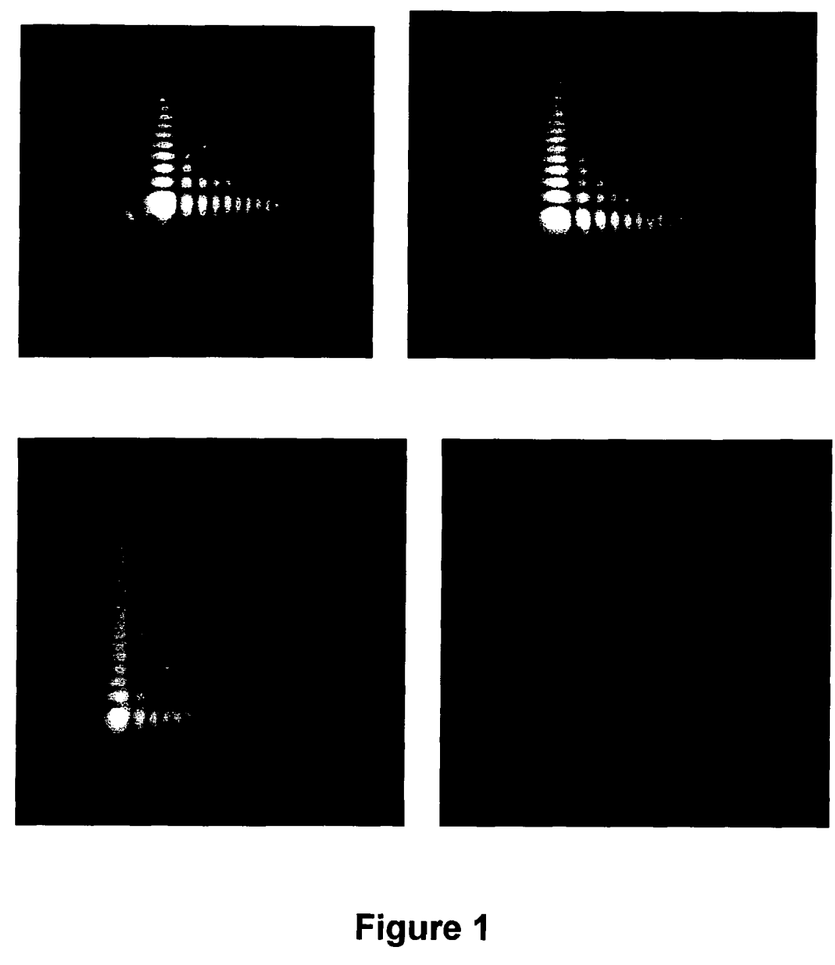
FIG. 1 is a series of images showing an Airy beam at different propagation distances.

FIG. 1 shows a series of images of two-dimensional intensity cross sections of an Airy beam at different propagation distances z (from left to right: z=0 µm, z=30 µm, z=60 µm, z=90 µm). The total transverse deflection in the series of images of FIG. 1 is Δx≈20 µm. From these, it can be seen that the beam has a main spot and a number of side lobes whose intensity decreases with increasing distance from the main spot.

The main spot, which is "pseudo-non-diffracting", follows a parabolic trajectory while propagating. This is important for particle guiding along the beam propagation axis. The intensity of the side lobes decreases with increasing distance from the main spot and the intensity pattern gradually smears out while the beam propagates, i.e., the relative potential well depth decreases. As a consequence, for sorting, particles or colloids are more effectively dragged into the main spot if the Airy beam is imaged slightly before the sample plane, instead of imaging it directly into this plane.

Figure 2:
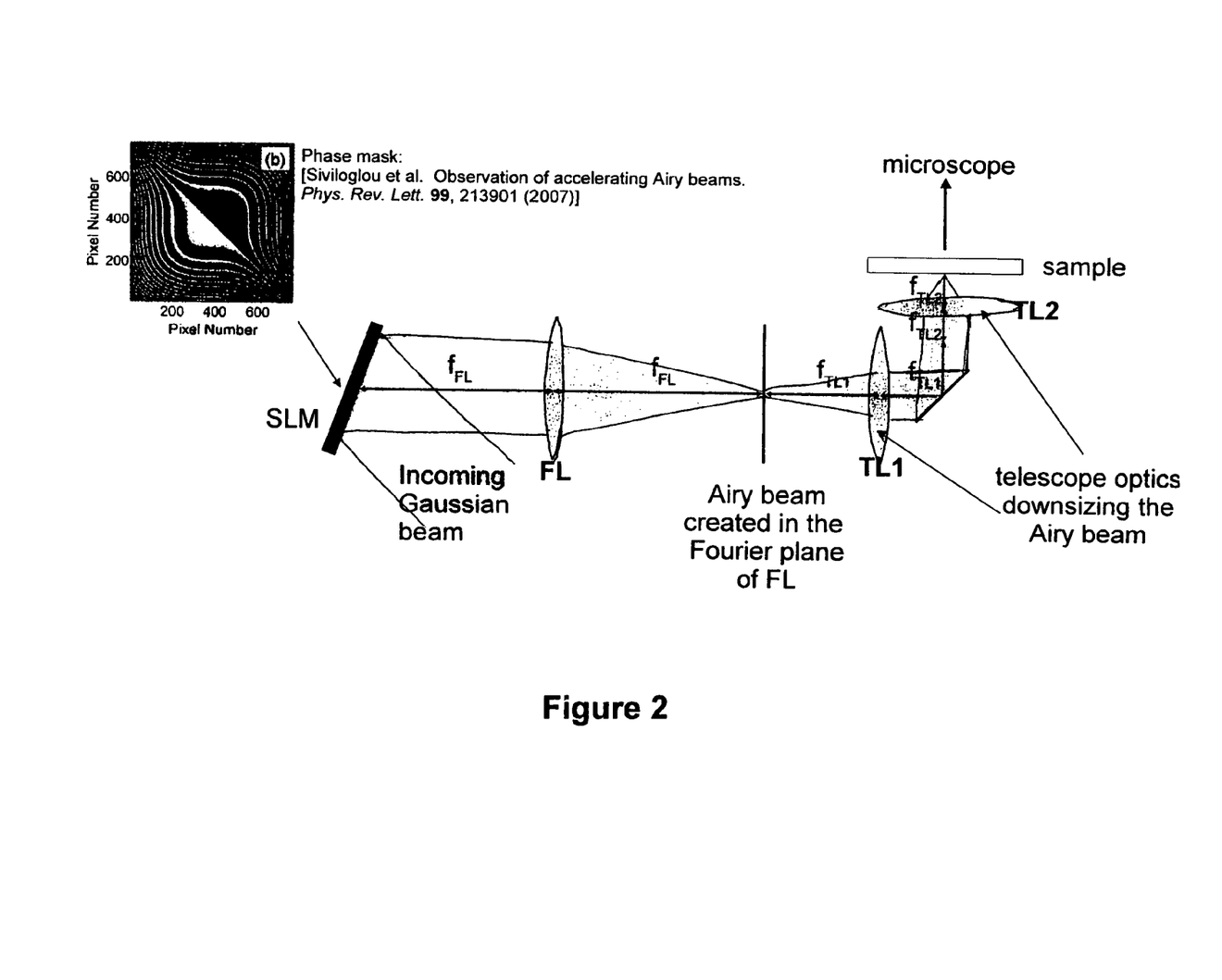
FIG. 2 is a schematic diagram of an experimental set up for generating an Airy beam.

To generate an Airy beam any suitable technique can be used. For the purposes of the experiments described herein, the approach used was as described by Siviloglou et al in "Observation of Accelerating Airy Beams" *Phys. Rev. Lett.* 99, 213901 (2007). The experimental set up is shown in FIG. 2. In this a Guassian beam is incident on a suitable phase mask/spatial light modulator (SLM). The phase mask is a grey-scale image that is transferred into an array of phase shifts between 0 and $2\pi$ by a liquid crystal that is, in essence, the SLM. The beam is reflected from the phase mask onto a lens that is positioned at a distance from the SLM matching its focal length. The lens focuses the light, so that an Airy beam is formed in its focal plane that is the fourier plane. The laser source used was an $Ar^+$ laser (linearly polarized light, wavelength 514 nm). The applied laser powers in the sample plane were typically 25 mW.

To access the micron-scale, the Airy beam was downsized using appropriate optics, for example inverse telescope optics having two lenses TL1 and TL2. Using this type of arrangement, the dimensions of the Airy beam were reduced from approximately 10 cm to approximately 50 µm in the propagation direction. Once appropriately sized, the beam is incident on a sample.

Figure 3:
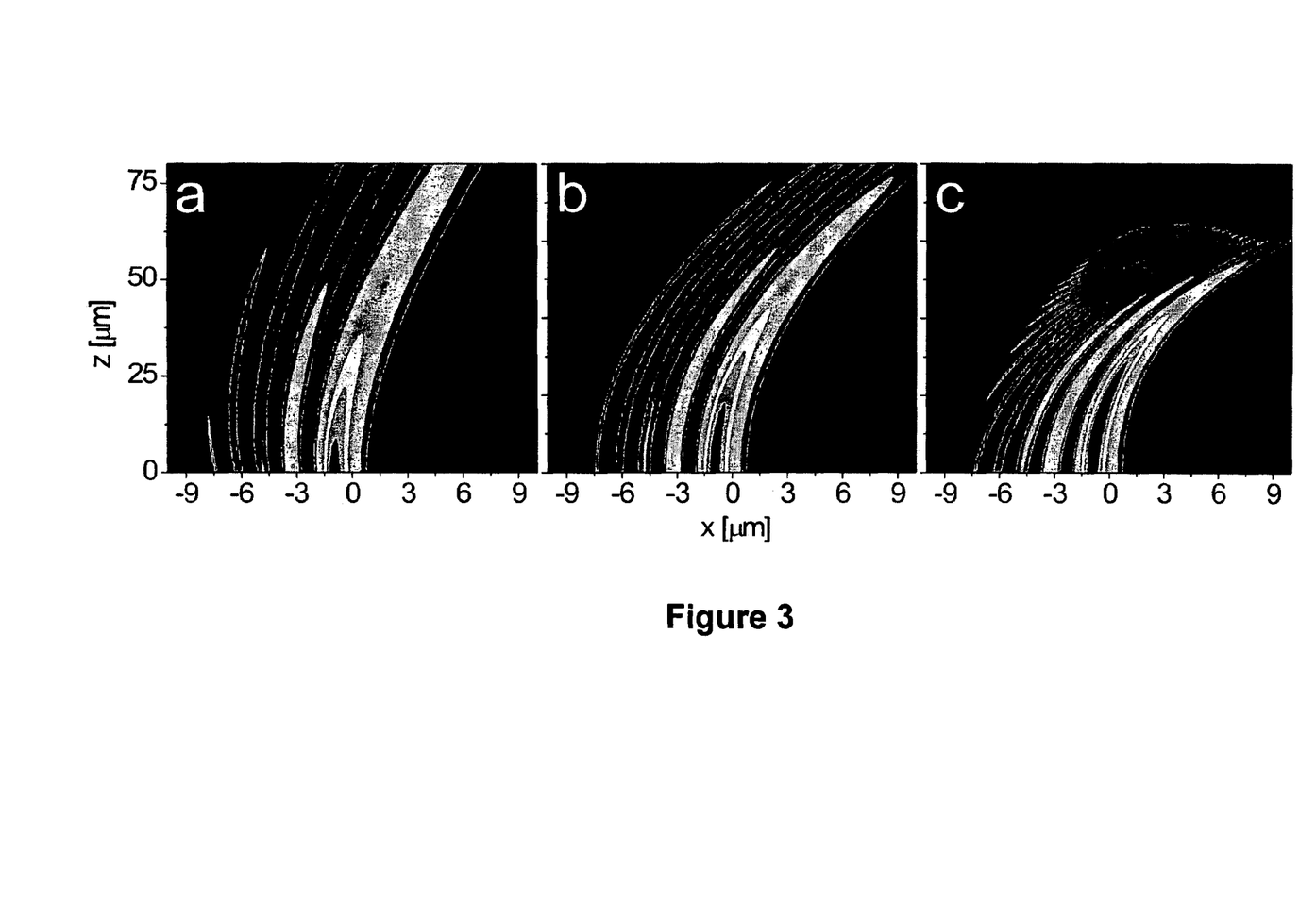
FIG. 3 is a series of images showing the downsizing of an Airy beam, these images being generated using parameters determined from measured intensity cross sections.

The setup of FIG. 2 allows both proper construction of the Airy beam in the Fourier plane and proper imaging into the sample plane if all pairs of lenses are mounted in 2f configuration. However, the position of the lenses may be varied to alter the transverse deflection. FIGS. 3 (a) to (c) show trajectories of the Airy beam for various different positions of the lenses TL1 and TL2 used in the inverse telescope optics. FIG. 3(b) shows the parabolic trajectory of the Airy beam's main spot when the telescope has a 2f configuration, i.e. mounted at a distance matching the sum of their focal lengths.

FIG. 3 shows how detuning of the 2f configuration of the downsizing telescope (lenses TL1 & TL2) affects the transverse deflection Δx of the Airy beam. From this it can be seen that the trajectory can be tailored by slightly detuning the telescope optics. In FIG. 3(a), the distance between the telescope lenses is smaller than in the 2f configuration and larger in FIG. 3(c). The detuning is approximately 6%. In FIG. 3(c) the transverse deflection of the Airy beam's main spot becomes almost twice as large as in FIG. 3(b). The displayed one-dimensional intensity cross sections versus the propagation distance were calculated on the basis of the paraxial equation and verified experimentally.

Similar transverse deflection effects may be obtained by detuning any distances between lenses in the optical path or by adding a lens function to the beam with the SLM. For example, the transverse deflection can be tailored through modification of the cubic phase imposed on the beam by the spatial light modulator (SLM). For instance, the Airy beam's main spot is deflected by $\Delta x \approx 20$ µm at a propagation distance of $z \approx 80$ µm if the cubic phase is $k_x^2$, $k_y^3 = -20\pi \ldots 20\pi$ in 1.5 cm. If $k_x^3$, $k_y^3 = -50\pi \ldots 50\pi$ in 1.5 cm then $\Delta x \approx 20$ µm at $z \approx 200$ µm. Accordingly, the curvature is reduced. Similar behaviour is expected for beam patterns created similarly to the Airy beam such as parabolic beams.

The Airy beam was incident onto a sample chamber containing an aqueous suspension of colloidal glass spheres (diameter 1.5 µm). Glass particles are heavy (density 1.5 g/cm$^3$) and, therefore, sediment back to sample bottom plates within a few seconds; this allows quick access to basic guiding studies. The sample chamber was 1 cm in diameter and 100 µm thick consisting of two cover slips with a vinyl spacer. Particles were imaged with a 40× objective onto the chip of a CCD camera, images recorded onto a hard disk. For recording particle trajectories, a standard detection algorithm was used. By adding a lens function, in this case a square phase, to the beam with a spatial light modulator (SLM), the Airy beam could be imaged before the sample plane.

Figure 4:
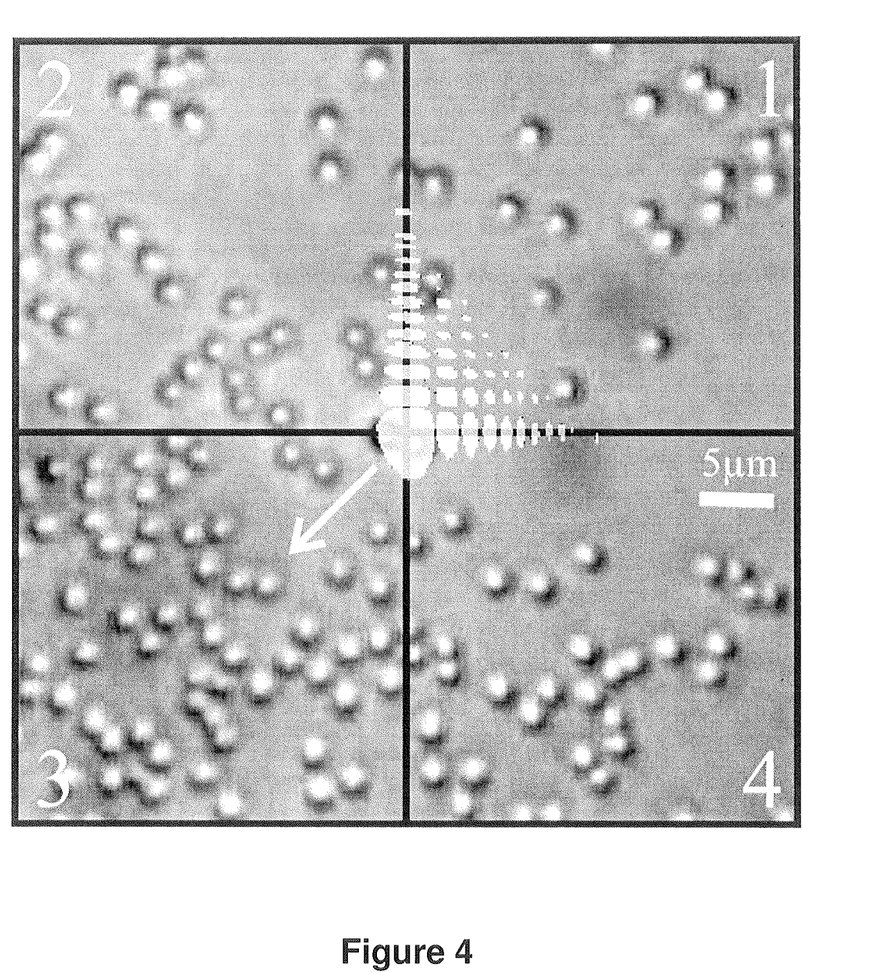
FIG. 4 is an image showing the clearing effect of an Airy beam.

To demonstrate the clearing properties of the Airy beam, a suspension of homogeneously distributed colloidal particles was exposed to the beam for two minutes. As a result, the particle distribution became highly asymmetric, as can be seen from FIG. 4, which shows particles being moved by an Airy beam from one sample section to another. In this case, the Airy beam is incident from below onto the sample plane. Particles are dragged into the main spot in section 1 and then guided vertically along a parabolic trajectory pointing towards section 3. The beam intensity is smeared out at a height of $z \approx 80$ µm and particles drop out of the main spot and sediment back to the sample bottom in section 3. In this way, the Airy beam clears section 1 and conveys particles precisely into section 3.

Figure 5:
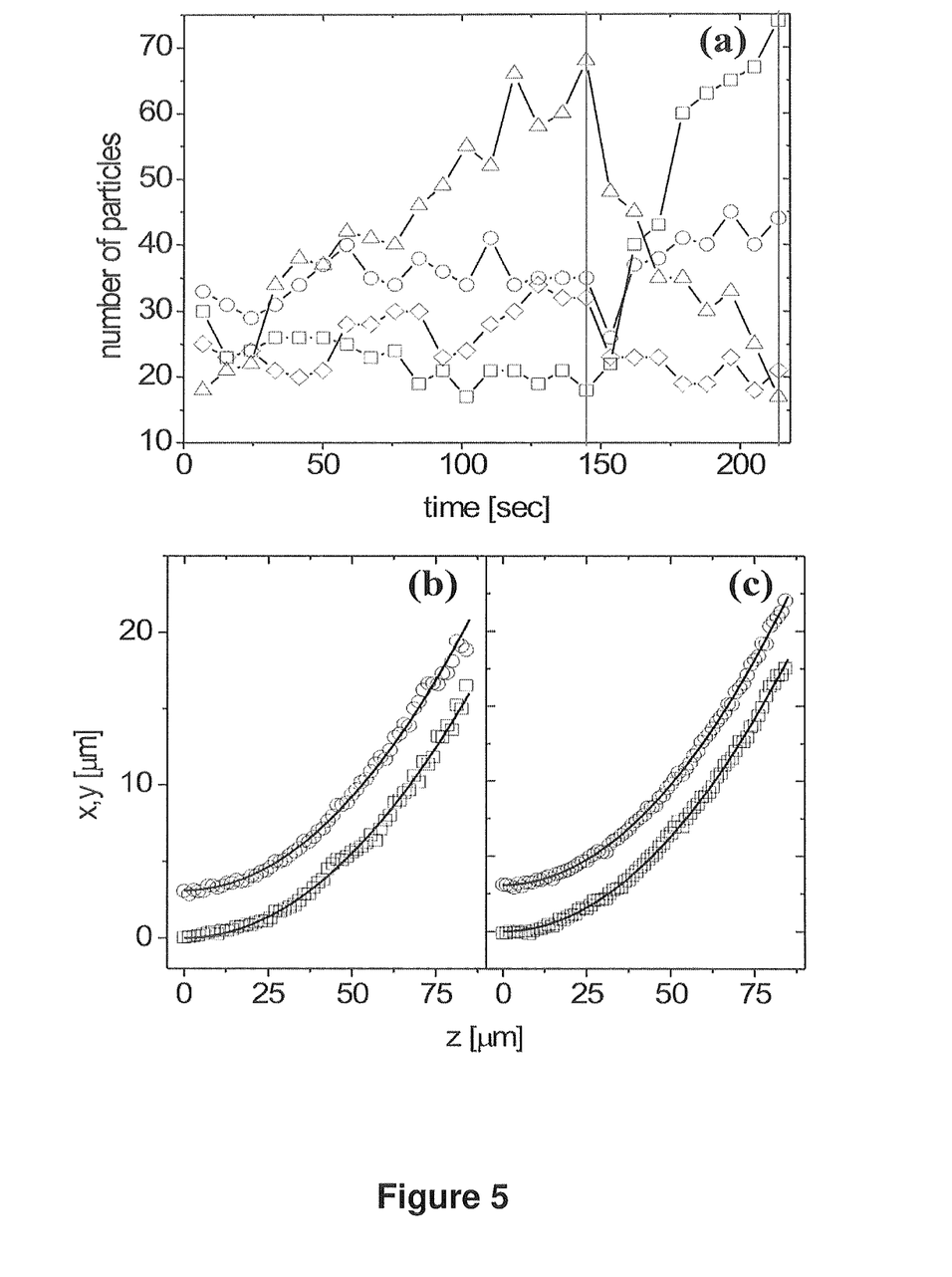

FIG. 5 illustrates the clearing effect in a more quantitative fashion. FIG. 5(a) shows particle number versus time in the four sections of FIG. 4, where squares, circles, triangles, and diamonds correspond to sections 1-4 respectively. The left vertical grey line corresponds to the situation shown on the image of FIG. 4. The Airy beam was then rotated by 180°. As a consequence, section 3 is emptied and particles are forwarded back to section 1. This data is shown between the two vertical grey lines. The total particle number increased during the measurement which explains why the particle number in the green section only displays a slight decrease during the first time slot; particles diffuse into the green section from outside which are subsequently dragged into the main spot of the Airy beam, hence mimicking a rather constant particle number.

To demonstrate that particles follow the Airy beam's main spot, FIGS. 5(b) and (c) show measured x-components and y-components (square and circle symbols, respectively) of particle trajectories along the main spot of the Airy beam versus the propagation distance z. Data in the y-direction are shifted vertically for clarity. FIGS. 5(b) and (c) correspond to Airy beams, which are oriented in opposite directions.

Figure 6:
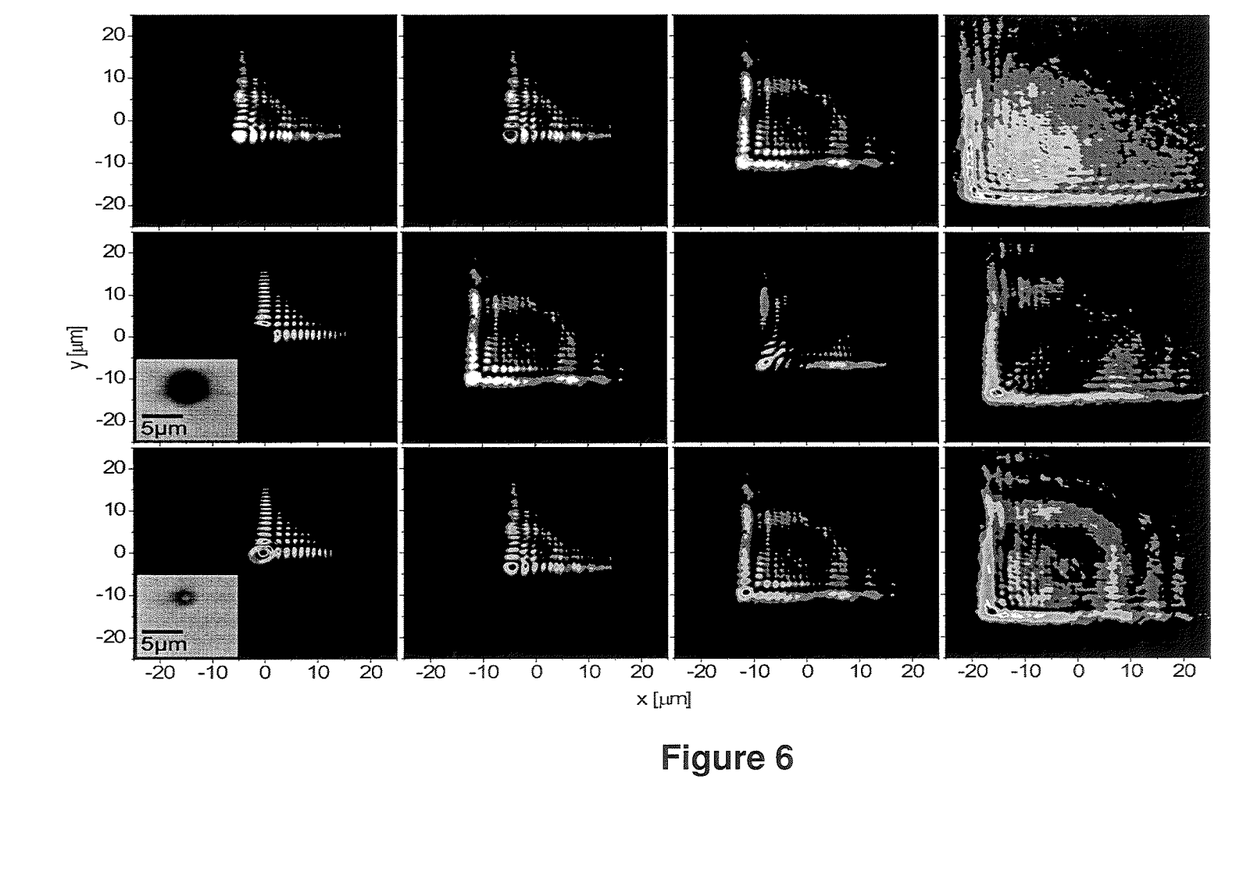

Intuitively, a colloidal particle in a laser beam is expected to significantly modify the intensity pattern. However, unexpectedly it has been found that Airy beams exhibit self-healing properties. FIG. 6(a) shows two-dimensional intensity cross sections at different propagation distances similar to those displayed of FIG. 1. In FIG. 6(b), a nontransparent particle blocks the Airy beam's main spot, which gradually reappears with increasing propagation distance, thereby demonstrating that the beam has self-healing properties. In FIG. 6(c), a transparent particle is considered which almost does not affect the beam intensity profile.

Figure 7:
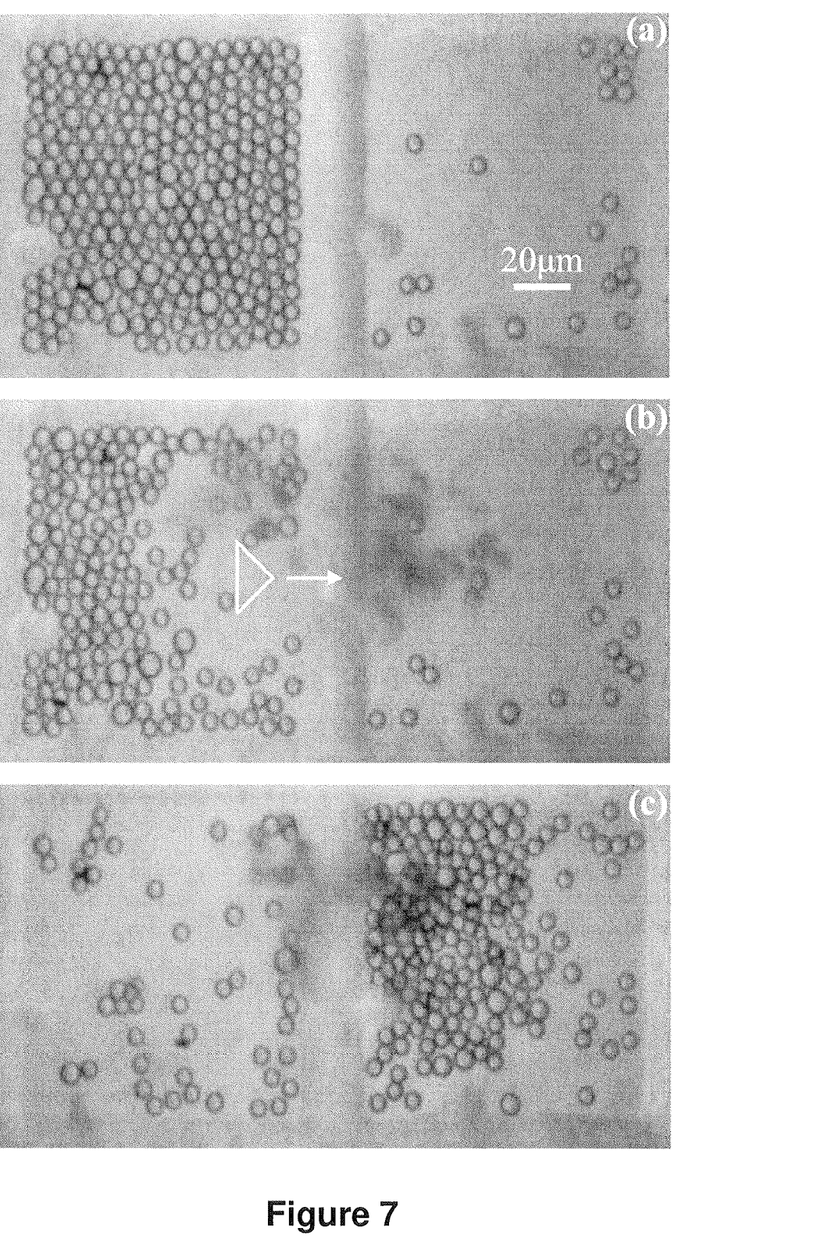
FIG. 7 is a series of images showing particles being blown over a wall using an Airy beam.

As demonstrated above, curved accelerating beams, such as Airy beams, can be used in optical micromanipulation. They have unique features that may be exploited for new methods in trapping and sorting namely allowing particles and cells to be cleared from a sample chamber, as well as allowing particles to precisely follow three dimensional parabolic trajectories. For example, FIG. 7 shows two compartments (size 100 μm×100 μm) separated by walls with a height of 20 μm. The Airy beam (indicated by the triangle) allows particle transport over the wall from one compartment into the other. These effects are expected to show selectivity in numerous particle and cell properties including size, weight and index of refraction. Where particles are suspended in a liquid, the effect may also depend on the properties of that liquid, for example the density and the index of refraction. Therefore, Airy beams open novel perspectives in both particle sorting and mixing. This is enhanced by the fact that no microfluidic flow and no complex beam motion are required.

A skilled person will appreciate that variations of the disclosed arrangements are possible without departing from the invention. For example, although the beams described above are used for moving cells from one region to another, they could also be used on aerosol or droplet ensembles to clear a path in air. Equally, although an Airy beam has been described, other beams with suitable properties could be used, for example a tilted Bessel beam. Bessel beams have a central spot with a plurality of concentric beams. To deflect particles along a three dimensional trajectory, the Bessel beam could be arranged to be incident on a sample such that its main spot causes one or more particles to be lifted. The beam could then be tilted to impart an acceleration that causes the particle to be projected into a curved trajectory. Accordingly the above description of the specific embodiment is made by way of example only and not for the purposes of limitation. It will be clear to the skilled person that minor modifications may be made without significant changes to the operation described.

The invention claimed is:

1. A method for manipulating one or more particles comprising exposing the one or more particles to a curved accelerating propagating non-Bessel beam of radiation, wherein the beam is curved in its direction of propagation and has an optical potential configured to lift and impart an acceleration to the one or more particles to cause simultaneous transverse deflection and vertical guiding of the one or more particles along the curved accelerating propagating beam in the direction of propagation of the beam to move the one or more particles from a current position to a new position in a curved trajectory, wherein the one or more particles are guided by the optical potential of the curved accelerating propagating beam until the beam's optical potential is overcome and the one or more particles fall under an action of gravity.

2. A method as claimed in claim 1 wherein the curved accelerating propagating beam has a three dimensional profile.

3. A method as claimed in claim 1 comprising imaging the curved accelerating propagating beam onto a plane before a sample plane that includes the one or more particles.

4. A method as claimed in claim 1 comprising clearing one or more areas of the one or more particles using the curved accelerating propagating beam.

5. A method as claimed in claim 1 comprising moving the one or more particles from one area to another using the curved accelerating propagating beam.

6. A method as claimed in claim 1 comprising moving the one or more particles over a barrier using the curved accelerating propagating beam.

7. A method as claimed in claim 6 wherein the barrier is physical or optical.

8. A method as claimed in claim 1 wherein the one or more particles are biological particles, wherein the one or more particles are cells with dielectric particles attached.

9. A method as claimed in claim 1 comprising sorting the one or more particles according to size and/or weight and/or index of refraction.

10. A method as claimed in claim 1 comprising detuning one or more lenses on an optical path of the beam.

11. A system for manipulating one or more particles comprising means for generating a one or more curved accelerating propagating non-Bessel beams of radiation, wherein the beams are curved in a direction of propagation and have an optical potential configured to lift and impart an acceleration to one or more particles exposed to the accelerating propagating beams to cause simultaneous transverse deflection and vertical guiding of the one or more particles along the curved accelerating propagating beams in the direction of the propagation of the beams to move the one or more particles from a current position to a new position in a curved trajectory, wherein the one or more particles are guided by the optical potential of the curved accelerating propagating beam until the beam's optical potential is overcome and the one or more particles fall under an action of gravity.

12. A system as claimed in claim 11 wherein the means for generating are operable to generate the curved accelerating propagation beam with a three dimensional profile.

13. A system as claimed in claim 11 comprising means for imaging the curved accelerating propagating beam onto a plane before a sample plane that includes the one or more particles.

14. A system as claimed in claim 11 comprising clearing one or more areas of particles using the curved accelerating propagating beam.

15. A system as claimed in claim 11 wherein the curved accelerating propagating beam is used to move the one or more particles from one area to another.

16. A system as claimed in claim 11 wherein the curved accelerating propagating beam is used to move the one or more particles over a barrier.

17. A system as claimed in claim 16 wherein the barrier is physical or optical.

18. A system for sorting particles comprising sorting one or more particles by generating a one or more curved accelerating propagating non-Bessel beams of radiation, wherein the beams are curved in a direction of propagation and have an optical potential configured for lifting and imparting an acceleration to the one or more particles exposed to the accelerating propagating beams to cause simultaneous transverse deflection and vertical guiding of the one or more particles along the curved accelerating propagating beam in the direction of propagation of the beam to move the one or more particles from a current position to a new position in a curved trajectory, wherein the one or more particles are guided by the optical potential of the curved accelerating propagating beam until the beam's optical potential is overcome and the one or more particles fall under an action of gravity.

19. A method for sorting one or more particles comprising sorting one or more particles by a one or more curved accelerating propagating non-Bessel beams of radiation, wherein the beams are curved in a direction of propagation and have an optical potential configured for lifting and/or imparting an acceleration to the one or more particles exposed to the accelerating propagating beams to cause simultaneous transverse deflection and vertical guiding of the one or more particles along the curved accelerating propagating beam in the direction of propagation of the beam to move the one or more particles from a current position to a new position in a curved trajectory, wherein the one or more particles are guided by the optical potential of the curved accelerating propagating beam until the beam's optical potential is overcome and the one or more particles fall under an action of gravity.

20. A method as claimed in claim 1, wherein the one or more particles are resting on a sample plane having an area, and wherein exposing the one or more particles to a curved accelerating propagating beam of radiation further comprises causing the one or more particles to move from a current position on the sample plane in a curved trajectory to a new position resting on a plane that is laterally positioned outside the area of the sample plane.

21. A system as claimed in claim 11, wherein the one or more particles are resting on a sample plane having an area, and wherein exposing the one or more particles to a curved accelerating propagating beam of radiation further comprises causing the one or more particles to move from a current position on the sample plane in a curved trajectory to a new position resting on a plane that is laterally positioned outside the area of the sample plane.

22. A method for manipulating one or more particles comprising exposing the one or more particles to a curved accelerating propagating Airy beam of radiation, wherein the beam is curved in its direction of propagation and has an optical potential configured to lift and impart an acceleration to the one or more particles to cause simultaneous transverse deflection and vertical guiding of the one or more particles along the curved accelerating propagating beam in the direction of propagation of the beam to move the one or more particles from a current position to a new position in a curved trajectory, wherein the one or more particles are guided by the optical potential of the curved accelerating propagating beam until the beam's optical potential is overcome and the one or more particles fall under an action of gravity.

23. A method as claimed in claim 22 wherein the curved accelerating propagating beam has a three dimensional profile.

24. A method as claimed in claim 22, wherein the one or more particles are resting on a sample plane having an area, and wherein exposing the one or more particles to a curved accelerating propagating beam of radiation further comprises causing the one or more particles to move from a current position on the sample plane in a curved trajectory to a new position resting on a plane that is laterally positioned outside the area of the sample plane.

25. A system for manipulating one or more particles comprising means for generating a one or more curved accelerating propagating Airy beams of radiation, wherein the beams are curved in a direction of propagation and have an optical potential configured to lift and impart an acceleration to one or more particles exposed to the accelerating propagating beams to cause simultaneous transverse deflection and vertical guiding of the one or more particles along the curved accelerating propagating beams in the direction of the propagation of the beams to move the one or more particles from a current position to a new position in a curved trajectory, wherein the one or more particles are guided by the optical potential of the curved accelerating propagating beam until the beam's optical potential is overcome and the one or more particles fall under an action of gravity.

26. A system as claimed in claim 25 wherein the curved accelerating propagating beam has a three dimensional profile.

27. A system as claimed in claim 25, wherein the one or more particles are resting on a sample plane having an area, and wherein exposing the one or more particles to a curved accelerating propagating beam of radiation further comprises causing the one or more particles to move from a current position on the sample plane in a curved trajectory to a new position resting on a plane that is laterally positioned outside the area of the sample plane.

28. A system for sorting particles comprising sorting one or more particles by generating a one or more curved accelerating propagating Airy beams of radiation, wherein the beams are curved in a direction of propagation and have an optical potential configured for lifting and imparting an acceleration to the one or more particles exposed to the accelerating propagating beams to cause simultaneous transverse deflection and vertical guiding of the one or more particles along the curved accelerating propagating beam in the direction of propagation of the beam to move the one or more particles from a current position to a new position in a curved trajectory, wherein the one or more particles are guided by the optical potential of the curved accelerating propagating beam until the beam's optical potential is overcome and the one or more particles fall under an action of gravity.

29. A system as claimed in claim 28 wherein the curved accelerating propagating beam has a three dimensional profile.

30. A system as claimed in claim 28, wherein the one or more particles are resting on a sample plane having an area, and wherein exposing the one or more particles to a curved accelerating propagating beam of radiation further comprises causing the one or more particles to move from a current position on the sample plane in a curved trajectory to a new position resting on a plane that is laterally positioned outside the area of the sample plane.

31. A method for sorting one or more particles comprising sorting one or more particles by a one or more curved accelerating propagating Airy beams of radiation, wherein the beams are curved in a direction of propagation and have an optical potential configured for lifting and/or imparting an acceleration to the one or more particles exposed to the accelerating propagating beams to cause simultaneous transverse deflection and vertical guiding of the one or more particles along the curved accelerating propagating beam in the direction of propagation of the beam to move the one or more particles from a current position to a new position in a curved trajectory, wherein the one or more particles are guided by the optical potential of the curved accelerating propagating beam until the beam's optical potential is overcome and the one or more particles fall under an action of gravity.

32. A method as claimed in claim 31 wherein the curved accelerating propagating beam has a three dimensional profile.

33. A method as claimed in claim 31, wherein the one or more particles are resting on a sample plane having an area, and wherein exposing the one or more particles to a curved accelerating propagating beam of radiation further comprises causing the one or more particles to move from a current position on the sample plane in a curved trajectory to a new position resting on a plane that is laterally positioned outside the area of the sample plane.

* * * * *